United States Patent
Kai et al.

(10) Patent No.: US 11,370,870 B2
(45) Date of Patent: Jun. 28, 2022

(54) AQUEOUS DISPERSION COMPRISING A POLYMER-INORGANIC PARTICLES COMPOSITE AND METHOD FOR PREPARING THE SAME

(71) Applicant: SWIMC LLC, Cleveland, OH (US)

(72) Inventors: Weihua Kai, Foshan (CN); Gang Duan, Northbrook, IL (US); Xi Zhao, Foshan (CN); Shigang Fan, Foshan (CN)

(73) Assignee: Guangdong Huarun Paints Co., Ltd., Foshan (CN)

( * ) Notice: Subject to any disclaimer, the term of this patent is extended or adjusted under 35 U.S.C. 154(b) by 248 days.

(21) Appl. No.: 16/630,950

(22) PCT Filed: Jul. 9, 2018

(86) PCT No.: PCT/US2018/041193
§ 371 (c)(1),
(2) Date: Jan. 14, 2020

(87) PCT Pub. No.: WO2019/014084
PCT Pub. Date: Jan. 17, 2019

(65) Prior Publication Data
US 2020/0247933 A1    Aug. 6, 2020

(30) Foreign Application Priority Data
Jul. 14, 2017    (CN) .......................... 201710579087.6

(51) Int. Cl.
| | |
|---|---|
| C08F 292/00 | (2006.01) |
| C03C 25/285 | (2018.01) |
| C03C 25/40 | (2006.01) |
| C03C 25/50 | (2006.01) |
| C09D 1/00 | (2006.01) |
| C09D 133/10 | (2006.01) |
| C08K 7/14 | (2006.01) |
| C08K 9/06 | (2006.01) |
| C08K 9/08 | (2006.01) |

(52) U.S. Cl.
CPC .......... *C08F 292/00* (2013.01); *C03C 25/285* (2013.01); *C03C 25/40* (2013.01); *C03C 25/50* (2013.01); *C09D 1/00* (2013.01); *C09D 133/10* (2013.01); *C08K 7/14* (2013.01); *C08K 9/06* (2013.01); *C08K 9/08* (2013.01); *C08K 2201/003* (2013.01)

(58) Field of Classification Search
CPC ....... C08F 292/00; C09D 133/10; C09D 1/00; C08K 7/14; C03C 25/40; C03C 25/50; C03C 25/285
USPC ....................................................... 428/432
See application file for complete search history.

(56) References Cited

U.S. PATENT DOCUMENTS

| | | | | |
|---|---|---|---|---|
| 3,253,978 | A * | 5/1966 | Bodendorf ............. | D21H 17/29 162/152 |
| 2004/0136933 | A1 | 7/2004 | Mistry et al. | |
| 2009/0017304 | A1 * | 1/2009 | Koller ................... | C08F 257/02 428/407 |
| 2011/0245388 | A1 * | 10/2011 | Monden ............... | C08K 5/5419 524/161 |
| 2015/0140322 | A1 | 5/2015 | Lin et al. | |

FOREIGN PATENT DOCUMENTS

| | | |
|---|---|---|
| CN | 1488693 A | 4/2004 |
| CN | 1517412 A | 8/2004 |
| CN | 1660917 A | 8/2005 |
| CN | 1927938 A | 3/2007 |
| CN | 102027027 A | 4/2011 |
| CN | 102093595 A | 6/2011 |
| CN | 102414232 A | 4/2012 |
| CN | 102649835 A | 8/2012 |
| CN | 103282387 A | 9/2013 |
| CN | 103980712 A | 8/2014 |
| CN | 104448168 A | 3/2015 |
| CN | 104540862 A | 4/2015 |
| CN | 104603183 A | 5/2015 |
| EP | 1445288 A2 | 8/2004 |
| WO | 2006037161 A1 | 4/2006 |

OTHER PUBLICATIONS

PCT International Search Report for PCT/US2018/041193, dated Oct. 22, 2018, 10 pages.
The First Office Action dated Feb. 17, 2021 for Canada Application No. 3,079,255, 3 pages.
The First Office Action and search report dated Mar. 24, 2021 for Chinese Application No. 201710579087.6, 14 pages.
The Decision to grant with a search report for Chinese Application No. 201710579087.6, dated Nov. 23, 2021, 8 pages.
Zhen Zhong et.al.: "Shape Control Synthesis of Silver Nanoparticles and Silver Polymeric Nanocomposites", Chemistry Progress, vol. 26, No. 12, Dec. 25, 2014, 12 pages.
Limin Wu et.al.: "Preparation, Structure and Perform of Organic-Inorganic Nano Hybrid Coatings", Paint & Coatings Industry, vol. 36, No. 8, in Aug. 2006, 5 pages.

(Continued)

*Primary Examiner* — Hui H Chin
(74) *Attorney, Agent, or Firm* — Law Offices of Liaoteng Wang

(57) ABSTRACT

The present disclosure refers to an aqueous dispersion comprising a polymer-inorganic particles composite and the method for preparing the same, wherein the polymer has ionic hydrophilic groups and hydrophobic long chain hydrocarbyl groups, and the polymer is covalently linked to said inorganic particles. The present disclosure also refers to powdered fillers obtained by drying the aqueous dispersion. The present disclosure further refers to a waterborne coating composition comprising the aqueous dispersion or the powdered fillers, as well as a coated article.

28 Claims, No Drawings

(56) References Cited

OTHER PUBLICATIONS

A. Benkaddour et.al.: "Study of the hydrophobization of TEMPO-oxidized cellulose gel through two routes: amidation and esterification process", Journal of Materials Science, vol. 49, No. 7, Jan. 7, 2014, 12 pages.

* cited by examiner

AQUEOUS DISPERSION COMPRISING A
POLYMER-INORGANIC PARTICLES
COMPOSITE AND METHOD FOR
PREPARING THE SAME

CROSS-REFERENCE TO RELATED
APPLICATION

This application is a National Stage of International Application No. PCT/US2018/041193, filed on Jul. 9, 2018, which claims priority to Chinese patent application number 201710579087.6 filed on Jul. 14, 2017, both of which are hereby incorporated by reference in their entireties.

TECHNICAL FIELD

The present disclosure refers to inorganic particles suitable for a waterborne coating composition. In particular, the present disclosure refers to an aqueous dispersion comprising a composite of polymer-inorganic particles and the method for preparing the same. The present disclosure also refers to powdered fillers obtained by drying the aqueous dispersion. The present disclosure further refers to a waterborne coating composition comprising the aqueous dispersion or the powdered fillers, as well as a coated article.

BACKGROUND

In recent years, with the development of society, the environmental problems caused by paints are attracting more and more attention. Governments have also enacted VOC emission standards for coatings to encourage the use of environmentally friendly coatings. Due to the absence or only small amount of organic solvents, waterborne coatings have significant environmental advantages. Thus, the development and application of waterborne coatings are very attractive.

In recent years, waterborne coatings have a growing application in the market. However, current waterborne coatings have some drawbacks including insufficient mechanical properties such as bad hardness, abrasion resistance, and scratch resistance. The drawback of insufficient mechanical properties is often overcome by adding an inorganic material as fillers into coating. However, this approach raises at least two issues. First, the compatibility between inorganic material and resin material is relatively poor. As a result, it is difficult to disperse inorganic filler is into resin material. Second, inorganic materials present in the coating are prone to settling, especially in waterborne coatings. It has been reported to use a coupling agent to modify the surface of an inorganic material for the purpose of improving the compatibility of inorganic material and resin material in coatings. However, coatings obtained by such simple surface modification still suffer from settling problem, especially in waterborne coatings. Therefore, the existing waterborne coatings still cannot meet the consumer's needs.

There is still a need in the coatings industry to provide further improved inorganic particles suitable for use in waterborne coating compositions.

SUMMARY

In one aspect, the present disclosure provides an aqueous dispersion comprising a polymer-inorganic particles composite is provided, wherein the polymer has ionic hydrophilic groups and hydrophobic long chain hydrocarbyl groups, and the polymer is covalently linked to said inorganic particles.

In another aspect, the present disclosure provides a process for the preparation of an aqueous dispersion, the process comprising the steps of:
a) providing inorganic particles bearing one or more groups reactive with a monomer component;
b) reacting a polymer-forming monomer component with the inorganic particles bearing one or more groups reactive with a monomer component, to obtain a polymer-inorganic particles composite, wherein the polymer has ionic hydrophilic groups and hydrophobic long chain hydrocarbyl groups, and the polymer is covalently linked to said inorganic particles;
c) adjusting the composite with a pH adjuster, to obtain the aqueous dispersion.

In another aspect, the present disclosure provides powdered fillers obtained by drying the aqueous dispersion according to the present disclosure.

The present disclosure also provides a waterborne coating composition comprising the aqueous dispersion or the powdered fillers according to the disclosure.

In addition, the present disclosure also provides a coated article, comprising a substrate on which the aqueous dispersion or the waterborne coating composition according to the present disclosure is applied.

The inventors have surprisingly found that by using the aqueous dispersion of the present disclosure, compatibility and sedimentation problems of inorganic particles in an aqueous system are solved. The inventors of the present disclosure have also surprisingly found that by using the aqueous coating compositions formulated with aqueous dispersions according to the present disclosure, the formed coatings have further improved hardness, abrasion resistance and/or scratch resistance.

Details of one or more embodiments of the invention will be set forth in the description below. Other features, objectives, and advantages of the invention will become apparent.

Selected Definitions

As used herein, "a", "an", "the", "at least one", and "one or more" are used interchangeably, unless indicated otherwise. Thus, for example, a coating composition that comprises "an" additive can be interpreted to mean that the coating composition includes "one or more" additives. The use of the singular form herein intended to include the corresponding plural form.

Throughout the present disclosure, where compositions are described as having, including, or comprising specific components or fractions, or where processes are described as having, including, or comprising specific process steps, it is contemplated that the compositions or processes as disclosed herein may further comprise other components or fractions or steps, whether or not specifically mentioned in this disclosure, but also it is contemplated that the compositions or processes may consist essentially of, or consist of, the recited components or steps.

For the sake of brevity, only certain ranges are explicitly disclosed herein. However, ranges from any lower limit may be combined with any upper limit to recite a range not explicitly recited, ranges from any lower limit may be combined with any other lower limit to recite a range not explicitly recited, and in the same way, ranges from any upper limit may be combined with any other upper limit to recite a range not explicitly recited. Additionally, although not explicitly recited, within a range includes every point or individual value between its end points. Thus, every point or individual value may serve as its own lower or upper limit combined with any other point or individual value or any other lower or upper limit, to recite a range not explicitly recited.

As used herein, "dispersion" refers to a composition in which at least one discontinuous phase, often in the form of one or more kinds of particles, is dispersed in a second continuous phase. The continuous phase often is in a form of liquid, and referred to as a liquid carrier.

As used in the context of "aqueous dispersion", "aqueous" refers to a dispersion in which liquid carrier constituting continuous phase includes at least 40 percent by weight of water based on the total weight of the liquid carrier. More preferably, liquid carrier constituting continuous phase includes at least 50 percent by weight, more preferably at least 60 percent by weight, even more preferably at least 80 percent by weight, or even as much as 99 or even 100 weight percent of water.

As used herein, the term "inorganic particles" refers to solid particles composed of an inorganic mineral material, which may have a regular shape such as a fiber shape, a spherical shape, a spheroidal shape, a rod shape, a disk shape, a regular polygon shape, or an irregular shape.

As used herein, the term "equivalent diameter" is interpreted as diameter in the case of spherical particles; or as the largest straight line drawn across the particle in the case of non-spherical particles, for instance but not limited to sheets, fibers, rods and platelets. In some embodiments of the invention, the inorganic particles have an equivalent diameter in the range of from 1 to 100 microns, preferably from 2 to 80 microns, more preferably from 5 to 50 microns, and most preferably from 7 to 30 microns.

As used herein, the recitations of numerical ranges by endpoints include all numbers subsumed within that range. For example, a range of 1 to 5 includes the values of 1, 1.5, 2, 2.75, 3, 3.80, 4, 5, etc. Further, a numerical range in the disclosure should be construed as including any subset of numbers in that range. For example, a disclosure of from 1 to 5 should be construed as including the subsets of from 1 to 4, from 1.5 to 4.5, from 1 to 2, and so forth.

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

DETAILED DESCRIPTION

In one aspect, the present disclosure provides an aqueous dispersion comprising a polymer-inorganic particles composite, wherein the polymer has ionic hydrophilic groups and hydrophobic long chain hydrocarbyl groups, and the polymer is covalently linked to said inorganic particles.

In the disclosure, polymer is covalently linked to inorganic particles, so that the modified inorganic particles are suitable for formulating coating composition, especially waterborne coating composition. The modified inorganic particles can be well compatible with the film-forming resin in the coating composition. In some preferred embodiments, polymer is covalently bonded to inorganic particles by a moiety containing —Si—O-linkage.

More surprisingly, the inventors have found that a polymer having both an ionic hydrophilic group and a hydrophobic long-chain hydrocarbon group having at least 8 carbon atoms is covalently bonded to inorganic particles. By doing this, an acrylic polymer may provide a significant thickening effect to the inorganic particles, thereby significantly reducing the risk of settling in the aqueous system.

According to the disclosure, the ionic hydrophilic group in the polymer comprises a potential anionic hydrophilic group, an anionic hydrophilic group, a potential cationic hydrophilic group, a cationic hydrophilic group or any combination thereof. Preferably, the ionic hydrophilic group comprises a carboxylic acid group or a salt thereof, a sulfuric acid group or a salt thereof, a phosphoric acid group or a salt thereof, a sulfonic acid group or a salt thereof, a phosphite group or a salt thereof, a phosphonic acid group or a salt thereof, an amine group or a quaternary ammonium salt thereof, or any combination thereof. In some particularly preferred embodiments, the ionic hydrophilic group is derived from the group consisting of (meth)acrylic acid and a salt thereof, itaconic acid and a salt thereof, maleic acid and a salt thereof, fumaric acid and a salt thereof, crotonic acid and a salt thereof, (meth)acrylamide and a quaternary ammonium salt thereof, and any combination thereof.

According to the disclosure, the hydrophobic long chain hydrocarbyl group is derived from a C8-C30 alkyl (meth)acrylate. In particular, the C8-C30 alkyl (meth)acrylate is selected from the group consisting of octyl (meth)acrylate, nonyl (meth)acrylate, decyl (meth)acrylate, isodecyl (meth)acrylate, tridecyl (meth)acrylate, lauryl (meth)acrylate, tetradecyl (meth)acrylate, pentadecyl (meth)acrylate, hexadecyl (meth)acrylate, heptadecyl (meth)acrylate, stearyl (meth)acrylate, nonadecyl (meth)acrylate, eicosyl (meth)acrylate, heneicosyl (meth)acrylate, docosyl (meth)acrylate, tricosyl (meth)acrylate, tetracosyl (meth)acrylate, pentacosyl (meth)acrylate, hexacosyl (meth)acrylate, heptacosyl (meth)acrylate, octacosyl (meth)acrylate, nonacosyl (meth)acrylate, triacontyl (meth)acrylate, and any combination thereof.

In some preferred embodiments, the C8-C30 alkyl (meth)acrylate is selected from the group consisting of decyl (meth)acrylate, isodecyl (meth)acrylate, tridecyl (meth)acrylate, lauryl (meth)acrylate, hexadecyl (meth)acrylate, stearyl (meth)acrylate, eicosyl (meth)acrylate, docosyl (meth)acrylate, tetracosyl (meth)acrylate and any combination thereof.

In the polymer, the molar ratio of the ionic hydrophilic group to the hydrophobic long chain hydrocarbyl group is from 1000:1 to 100:1, preferably from 500:1 to 100:1, more preferably from 400:1 to 200:1, and most preferably from 350:1.

The polymer having the above-mentioned molar ratio of the ionic hydrophilic group to the hydrophobic long chain hydrocarbon group can provide a significant thickening effect to inorganic particles, thereby reducing the sedimentation problem of the inorganic particles in the aqueous system and remarkably improving the stability of aqueous system. The aqueous dispersions of the disclosure exhibit good stability even at higher storage temperatures. Although the molar amount of the hydrophobic long chain hydrocarbyl group in the polymer is not so high, it is important in reducing the sedimentation problem of the inorganic particles in the aqueous system and improving the storage stability of the aqueous system.

In the disclosure, inorganic particles are solid particles composed of an inorganic mineral material. Inorganic particles may have any shapes, for example a regular shape such as a fiber shape, a spherical shape, a spheroidal shape, a rod shape, a disk shape, a regular polygon shape, or an irregular shape. Preferably, inorganic particles comprise inorganic fibers. More preferably, inorganic fibers comprise glass fibers, silica fibers, boron fibers, ceramic fibers, metal fibers or combination thereof. Preferably, in some embodiments of the disclosure, glass fibers are used as inorganic fibers. Glass fibers are known to have substantially comparable mechanical properties to other fibers such as polymeric fibers and carbon fibers. Although not as strong or rigid as carbon fiber, glass fibers have an advantage of being less costly and less brittle when used in coatings. Therefore, glass fibers have a considerable application prospect in the coating industry.

Preferably, the inorganic particles according to the present disclosure have a specific particle size. Herein, average equivalent diameter is used to measure the geometry of inorganic particles. Average equivalent diameter represents the average value of the equivalent diameters of inorganic particles, and can be determined by various methods, such as counting a certain amount of maximum length values of inorganic particles by a microscope followed by averaging these values. Particular methods and apparatus for measuring geometries are known in the art.

In an embodiment, inorganic particles have an average equivalent diameter of from 1 to 100 microns, preferably from 2 to 80 microns, more preferably from 5 to 50 microns, most preferably from 7 to 30 microns. For example, the average equivalent diameter may be 2 microns, 3 microns, 5 microns, 7 microns, 10 microns, 15 microns, 20 microns, 25 microns, 30 microns, 35 microns, 40 microns, 50 microns, 60 microns, or 70 microns.

In an embodiment, the amount of inorganic particles is from 40 to 99.5 wt %, preferably from 50 to 98 wt %, more preferably from 80 to 95 wt %, and most preferably 93 wt %, relative to the total weight of the inorganic particles and the polymer-forming monomer components.

According to the disclosure, the aqueous dispersion has a solid content of from 50 to 90% preferably from 60 to 80 wt %, more preferably from 65 to 75 wt %, and most preferably 70%.

According to the disclosure, the aqueous dispersion has a pH value of from 6 to 9, preferably from 6.5 to 8.6, for example 7.3.

In another aspect, the present disclosure provides a process for the preparation of an aqueous dispersion, comprising the steps of:
a) providing inorganic particles bearing one or more groups reactive with a monomer component;
b) reacting a polymer-forming monomer component with the inorganic particles bearing one or more groups reactive with a monomer component, to obtain a polymer-inorganic particles composite, wherein the polymer has ionic hydrophilic groups and hydrophobic long chain hydrocarbyl groups, and the polymer is covalently linked to said inorganic particles;
c) adjusting the composite with a pH adjuster, to obtain the aqueous dispersion.

According to the disclosure, the process for the preparation of an aqueous dispersion comprises step a) of providing inorganic particles bearing one or more groups reactive with a monomer component. Such inorganic particles may be commercially available or may be synthesized.

In an embodiment of the disclosure, inorganic particles bearing one or more groups reactive with a monomer component is synthesized, and is provided by modifying the inorganic particles with coupling agent bearing one or more groups reactive with a monomer component According to the disclosure, the coupling agent is a substance used for surface modifying inorganic particles and providing the inorganic particles with one or more groups reactive with a monomer component, preferably providing with an ethylenically unsaturated functional group.

In an embodiment of the disclosure, coupling agent comprises a silane compound having the formula:

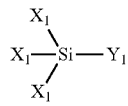

in which each $X_1$ is independently selected from the group consisting of —Cl, —OCH$_3$, —OCH$_2$CH$_3$, —OC$_2$H$_4$OCH$_3$, —OSi(CH$_3$)$_3$, and —OCOCH$_3$; and $Y_1$ is an alkyl group substituted with an ethylenically unsaturated functional group. Preferably, the silane compound comprises γ-methacryloxypropyl trimethoxy silane.

In another embodiment of the disclosure, the coupling agent comprises an oligomeric silane having the formula:

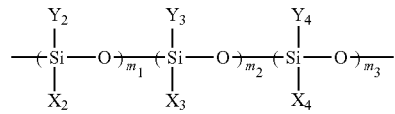

wherein each of $X_2$, $X_3$ and $X_4$ is independently selected from the group consisting of —Cl, —OCH$_3$, —OCH$_2$CH$_3$, —OC$_2$H$_4$OCH$_3$, —OSi(CH$_3$)$_3$, —OCOCH$_3$, —H, —CH$_3$, —C$_2$H$_5$, and —OH with the proviso that at least one of $X_2$, $X_3$ and $X_4$ is not —H, —CH$_3$, —C$_2$H$_5$, or —OH; each of $Y_2$, $Y_3$ and $Y_4$ is independently an alkyl group substituted with an ethylenically unsaturated functional group; and each of $m_1$, $m_2$ and $m_3$ independently is from 0 to 200, with the proviso that at least one of $m_1$, $m_2$ and $m_3$ is not 0. Preferably, $Y_2$, $Y_3$ and $Y_4$ is independently an alkyl group substituted with γ-methacryloxypropyl.

The amount of coupling agent can be selected in an appropriate range according to needs. Preferably, the coupling agent is used in an amount of from 0.2 to 10 wt %, preferably from 0.5 to 8 wt %, more preferably from 0.8 to 6 wt %, even more preferably from 1 to 5 wt %, relative to the total weight of the inorganic particles. For examples, the coupling agent is used in an amount of 2 wt %, 3 wt %, 4 wt % or 5 wt %. Too low amount of coupling agent cannot provide a sufficient amount of functional groups reactive with a monomer component. Too high amount of coupling agent may adversely reduce the mechanical properties of the inorganic particles.

In the above step a), a person skilled in the art could determine appropriate conditions for surface modification of inorganic particles with coupling agent, including the use of the solvent, the type of the catalyst, the reaction temperature, the reaction time, and the like, depending on the types of the inorganic particles and the coupling agent.

As an example, in a particular embodiment, the step of surface modifying the inorganic particles with a coupling agent is carried out by mixing inorganic particles with a coupling agent in a xylene solution having a pH of about 6.0, and adding catalyst, then keeping the mixture at room temperature for 2 days to obtain inorganic particles with one or more groups reactive with a monomer component. The resulting inorganic particles can be used directly in a subsequent process or can be separated from the reaction mixture and dried for later use.

Any solvent well known to those skilled in the art, such as xylene, toluene or a combination thereof, may be used, but the solvent is not limited thereto. As an example of the catalyst, triethylamine can be used.

According to the present disclosure, the process for the preparation of an aqueous dispersion comprises step b) of reacting a polymer-forming monomer component with the inorganic particles from step a), to obtain a polymer-inorganic particles composite.

The polymer-forming monomer component comprises monomer component having an ionic hydrophilic group, and can be selected from the group consisting of: (meth)acrylic acid, itaconic acid, maleic acid, fumaric acid, crotonic acid, (meth)acrylamide, and any combination thereof.

The polymer-forming monomer component comprises monomer component having a hydrophobic long chain hydrocarbyl group, including C8-C30 alkyl (meth)acrylate monomer, preferably C8-C22 alkyl (meth)acrylate monomer. In some embodiments, the monomer component having a hydrophobic long chain hydrocarbyl group is selected from octyl (meth)acrylate, nonyl (meth)acrylate, decyl (meth)acrylate, isodecyl (meth)acrylate, tridecyl (meth) acrylate, lauryl (meth)acrylate, tetradecyl (meth)acrylate, pentadecyl (meth)acrylate, hexadecyl (meth)acrylate, heptadecyl (meth)acrylate, stearyl (meth)acrylate, nonadecyl (meth)acrylate, eicosyl (meth)acrylate, heneicosyl (meth) acrylate, docosyl (meth)acrylate, tricosyl (meth)acrylate, tetracosyl (meth)acrylate, pentacosyl (meth)acrylate, hexacosyl (meth)acrylate, heptacosyl (meth)acrylate, octacosyl (meth)acrylate, nonacosyl (meth)acrylate, triacontyl (meth) acrylate, and any combination thereof.

In some preferred embodiments, the C8-C30 alkyl (meth) acrylate monomer is selected from the group consisting of: decyl (meth)acrylate, isodecyl (meth)acrylate, tridecyl (meth)acrylate, lauryl (meth)acrylate, hexadecyl (meth) acrylate, stearyl (meth)acrylate, eicosyl (meth)acrylate, docosyl (meth)acrylate, tetracosyl (meth)acrylate and any combination thereof.

In the polymer-forming monomer component, the molar ratio of the monomer component having ionic hydrophilic group to the monomer component having hydrophobic long chain hydrocarbyl group is in a range of from 1000:1 to 100:1, preferably from 500:1 to 100:1, more preferably from 400:1 to 200:1, and most preferably from 350:1. In the modification of inorganic particles, the polymer formed by using such ratio of monomer components can provide a significant thickening effect to the inorganic particles, thereby improving the storage stability of the inorganic particles.

According to the disclosure, step b) is carried out in the presence of an agent that helps promote the desired reaction, such as in the presence of an initiator. The initiator can include a photoinitiator, a thermal initiator, or a combination thereof.

When a thermal initiator is used, the thermal initiator facilitates the polymerization of monomer components by a free radical mechanism and typically includes a peroxide or azo compound. The thermal initiator is preferably present in an amount of from about 0.1 wt % to about 1 wt %, based on the total weight of the reactive components.

As peroxide compounds suitable for use as initiators in the present disclosure, t-butyl perbenzoate, t-amyl perbenzoate, cumene hydroperoxide, t-amyl perocotate, methyl ethyl ketone peroxide, benzoyl peroxide, cyclohexanone peroxide, 2,4-pentanedione peroxide, di-t-butyl peroxide, t-butyl hydroperoxide, di-(2-ethylhexyl)-peroxydicarbonate or mixture thereof can be used. As azo compounds suitable for use in the present disclosure, 2,2-azobis-(2,4-dimethylpentane-nitrile), 2,2-azobis-(2-methylbutanenitrile), 2,2-azobis-(2-methylpropanenitrile) or mixture thereof can be used.

It is especially preferred that step b) according to the disclosure comprises a thermal initiator 2,2-azobis(2-methylpropionitrile) (AIBN). Polymerization can be carried out by heating to obtain a polymer-inorganic particle composite.

According to the present disclosure, the process for the preparation of an aqueous dispersion comprises the step of adjusting the composite formed in the step b) with a pH adjuster, thereby obtaining a relatively stable aqueous dispersion slurry.

The pH adjuster comprises inorganic acids, organic acids, alkaline (earth) metal oxides, alkaline (earth) hydroxides, alkaline (earth) salts, ammonia, or any combination thereof. Examples of the pH adjuster include but not limited to HCl, $H_2SO_4$, $H_3PO_4$, $HNO_3$, citric acid, succinic acid, malic acid, lactic acid, ammonia, NaOH, KOH, calcium carbonate, sodium carbonate, or any combination thereof.

The inventors have surprisingly found that the aqueous dispersions made by the process of the present disclosure, when added to waterborne coating compositions, can significantly improve the stability of waterborne coating compositions and result in a coating with maintained or further improved hardness, abrasion resistance and scratch resistance. In contrast to the present disclosure, when untreated/unmodified inorganic particles are added to an aqueous coating composition, the system exhibits significant sedimentation problem, and the improvements of hardness, scratch resistance and abrasion resistance of the resulting coating are very limited, so the coating still cannot meet the consumer's needs.

In another aspect, the disclosure provides powdered fillers obtained by drying the aqueous dispersion according to the disclosure. The powder filler itself has relatively high stability and can be easily stored, transported and conveniently used. Methods and configurations for drying are well known in the art, such as evaporation, reduced pressure drying, spray drying, and fluidized bed drying.

According to the disclosure, the above drying step can be carried out before or after step c) of adjusting the pH value.

In another aspect, the disclosure also provides a waterborne coating composition comprising the polymer-inorganic particles composite or the aqueous dispersion or powdered fillers according to the disclosure. The polymer-inorganic particles composite or the aqueous dispersion or powdered fillers according to the disclosure can be added as additives into waterborne coating composition. The waterborne coating composition according to the disclosure may also comprise film-forming resin components, and optionally crosslinkers, solvents and additional additives.

In an embodiment of the disclosure, the aqueous dispersion is present in an amount of from 1 to 30 wt %, preferably from 2-20 wt %, more preferably from 5-10 wt %, relative to the total weight of the waterborne coating composition. In some embodiments, the aqueous dispersion is present in an amount of 1 wt %, 2 wt %, 3 wt %, 4 wt %, 5 wt %, 6 wt %, 7 wt %, 8 wt %, 9 wt %, 10 wt %, 11 wt %, 12 wt %, 13 wt %, 14 wt %, 15 wt %, 18 wt %, 20 wt %, 22 wt %, 25 wt %, or 30 wt %, relative to the total weight of the waterborne coating composition.

The coating composition of the present disclosure further comprises a film-forming resin component commonly used in the coating field. The film-forming resin component includes but not limited to, an alkyd resin, a polyurethane resin, a phenol resin, a polyester resin, an acrylate resin, an epoxy resin, a nitrocellulose (NC), etc.

The film-forming resin component may be synthetic or commercially available. In an embodiment of the present disclosure, an acrylic aqueous latex Dow 3311, commercially available from Dow, is used as a film-forming resin component.

The amount of film-forming resin component in the coating composition of the disclosure can be varied within a wide range, and can be reasonably determined by a person skilled in the art. in the coating composition of the disclosure, additional resin(s) can be present in an amount of from 20 to 90 wt %, preferably from 30 to 90 wt %, more preferably from 40-90 wt %, even more preferably from 60 to 90 wt %, relative to the total amount of the coating composition.

Optionally, the coating composition of the disclosure may additionally comprise a crosslinking agent so that the resin component in the coating composition reacts with the crosslinking agent such as an isocyanate-functional component to effect crosslinking of the polymeric chain, and thereby forming a coating with a three-dimensional network structure.

In an embodiment of the disclosure, the coating composition of the invention comprises a crosslinking agent containing an isocyanate-functional group (e.g., SPAICI Hardener ES), wherein the molar equivalent ratio of the hydroxyl functional group of the resin component to the isocyanate functional group of the polyisocyanate is in a range of from 0.8:1 to 1.2:1, preferably in the range of 0.9:1 to 1.1:1.

If desired, the waterborne coating composition of the disclosure may contain a small amount of water-miscible organic cosolvent to further enhance its processability. Suitable organic cosolvents include alcohols such as ethanol, n-propanol, isopropanol, n-butanol, isobutanol, etc.; ketones such as acetone, 2-butanone, cyclohexanone, methyl aryl ketones, ethyl aryl ketones, methyl isoamyl ketones, etc.; glycols such as butyl glycol; glycol ethers such as ethylene glycol monomethyl ether, ethylene glycol monoethyl ether, ethylene glycol monobutyl ether, propylene glycol monomethyl ether, methoxypropanol, etc.; glycol esters such as butyl glycol acetate, methoxypropyl acetate, etc.; and mixtures thereof. Preferably, glycol ether is used as the organic cosolvent.

In the coating composition of the disclosure, the organic cosolvent, if present, may be present in an amount of from about 0 to 30 wt %, preferably from 1 to 25 wt %, more preferably from 5 to 10 wt %, relative to the total of the waterborne coating composition.

The coating composition can optionally comprise additional additives commonly used in coating compositions that do not adversely affect the coating composition or the cured coating derived therefrom. Suitable additives include for example those for improving processability or manufacturability properties of the composition, enhancing aesthetics of the composition, or improving specific functional properties or characteristics of the coating composition or cured composition derived therefrom (such as adhesion to a substrate). Depending on actual needs, additives which may be included in the coating composition comprise such as, but not limited to, fillers, anti-skinning agents, driers, emulsifiers, pigments, anti-migration aids, antibacterial agents, chain extenders, lubricants, wetting agents, biocides, plasticizers, defoamers, colorants, waxes, antioxidants, anticorrosive agents, flow control agents, thixotropic agents, dispersants, adhesion promoters, UV stabilizers, defoaming Agents, pH adjusters, leveling agents or a combination thereof. The amount of each of optional ingredients is sufficient to achieve its intended purpose, but preferably such amount does not adversely affect the coating composition or the cured coating derived therefrom.

In preferred embodiments, the coating composition of the present disclosure comprises from about 0 to about 10 wt %, preferably from about 0.1 to about 0.5 wt % of additional additives, relative to the total weight of the coating composition. Specifically, the amount of additional additives in the coating composition is from about 0.2 wt %, 0.3 wt %, about 0.4 wt %, about 0.6 wt %, about 0.7 wt %, about 0.8 wt % or about 0.9 wt % to about 9.0 wt %, about 7.0 wt %, about 6.0 wt %, about 5.0 wt %, about 4.0 wt %, about 2.0 wt % or about 1.0 wt %, relative to the total weight of the coating composition.

In the present disclosure, the coating composition can be prepared by any suitable method well known to those skilled in the art. For example, the coating composition can be prepared by adding all of the components to the container and then stirring the resulting mixture to obtain homogeneity. Alternatively, the coating composition can be prepared by first mixing some of the components and then adding the remaining components to form a homogeneous mixture.

According to the invention, the coating composition can be applied by conventional application methods known to those skilled in the art. The application methods include dip coating, spin coating, spray coating, curtain coating, brush coating, roll coating, and other application methods known in the art. In the present disclosure, a wet on dry application process may be used. Conveniently, the solvent in the coating composition can be removed by drying in ambient conditions or with (for example, under) heat, so that a coating is formed.

Thus, the disclosure also provides a coated article, comprising a substrate on which the aqueous dispersion according to the disclosure or the waterborne coating composition according to the disclosure is applied. The substrate may be any coatable material. A person skilled in the art would choose and determine a suitable material as the substrate according to actual needs. In some preferred embodiments, the article according to the invention may be a wood substrate, a metal substrate, a cement product, a ceramic, a plastic substrate or a building wall or the like.

Test Methods

The following test methods are used herein, unless otherwise indicated.

Average Equivalent Diameter of Inorganic Particles 1-2 g of inorganic particles were placed in a glass beaker. 25 g of pure water was poured into the glass beaker. Then, ultrasonic treatment was performed to disperse the inorganic particles in water and form a suspension. The suspension of the inorganic particles was dropped onto a glass slide, and dried in cold air from a hair dryer. The slides were placed on a digital microscope (Leica DVM6 A) and images of inorganic particles were taken. The LAS software equipped with the Master module were used for statistically analysis of diameters in images under the Grain Size function.

Gloss

The gloss of the cured coating was evaluated in this test according to ASTM D523.

Adhesion

Adhesion test was performed to assess whether the coating adhered to the substrate. This adhesion test was carried out in accordance with the ASTM D 3359 test method. Adhesion was usually classified into 0-5B grades.

Pencil Hardness

This test was carried out to measure the hardness of the cured coating. Pencil hardness was evaluated according to ASTM D3363. The data was reported in the form of the last successful pencil prior to film rupture. Thus, for example, if a coating does not rupture when tested with a 2H pencil, but ruptures when tested with a 3H pencil, the coating is reported to have a pencil hardness of 2H.

Dry Film Transparency

This test was performed to evaluate the optical properties of a cured coating. The formulated samples were spread on a transparent PVC panel at a wet thickness of about 100 microns and then dried sufficiently for 3 days. A reflectometer, for example with RT-6000 from Oakland, USA, was used for determining the transparency of the film.

Scratch Resistance (Anti-Scratch)

This test was performed to evaluate the scratch resistance of a cured coating under a load of a certain weight (in g). The formulated sample was spread on a metal plate at a wet thickness of about 100 microns, and then sufficiently dried for 3 days. Subsequently, the dry film thickness was examined. Thereafter, a scratch-resistant machine was used for performing the scratch resistance test in accordance with ASTM D2197. The data was reported in the form of scratch load (weight) before the test failed. For example, if a test sample passes the test under a load of 300 g but fails under a load of 400 g, the sample is recorded to have a scratch resistance of 300 g.

Abrasion Resistance

This test was performed to obtain the abrasion resistance of a cured coating, which was expressed by the film retention in %. A plurality of formulated samples were applied side by side on black PVC at a wet thickness of about 100 microns, and then sufficiently dried for 3 days. Subsequently, the dry film thickness was examined. Thereafter, a wear machine (for example, a wet abrasion tester REF 903 available from Sheen, England) was used for performing the abrasion resistance test with an aqueous medium containing grit with a particle size of 300-400 mesh. After rubbing 500 times, the test was stopped to determine the retention rate (%) of the film.

Settlement

This test was performed to evaluate the settling properties of a coating composition. The coating composition to be tested was placed in oven at a constant temperature (50° C.) for two weeks. Then the system was checked for precipitation and the presence or absence of precipitates.

EXAMPLES

Unless otherwise noted, all parts, percentages, and ratios reported in the following examples are on a weight basis, and all reagents used in the examples are commercially available and used directly without further treatment.

Example 1

Aqueous Dispersion

Surface Modification of Glass Fiber

The surface modification process was performed as follows: KH570 (γ-methacryloxypropyl trimethoxy silane) was used as the coupling agent. The glass fibers XGFT 91000 available from Shenzhen Xiangu High-Tech. Co., Ltd. were used as inorganic particles. Glass fiber was added to a reaction flask equipped with a magnetic stir bar, a condenser, and a nitrogen inlet, followed by the addition of xylene. Then, KH570 and triethylamine as a catalyst were successively added to the reaction flask. The reaction mixture was kept at room temperature for 2 days. Glass fibers treated with silane were obtained.

Surface modified glass fibers were obtained using the ingredients in Table 1 below.

TABLE 1

| Raw materials | Description | Weight (g) |
|---|---|---|
| XGFT 91000 | Inorganic fibers with average equivalent diameter of 12.5 microns | 100 |
| Xylene | Solvent | 150 |
| KH570 | Silane compound | 1-5 |
| Triethylamine | Catalyst | 0.01-0.05 |

Polymer-Inorganic Particles Composite

As shown in Table 2, the surface-modified glass fibers were reacted with an acrylic monomer. Under good stirring, the obtained surface-modified glass fibers, cyclohexane, acrylic acid, lauryl methacrylate, azobisisobutyronitrile (AIBN) were added to a flask equipped with a condenser and a nitrogen inlet. The reaction mixture was heated to 68° C. for 2 hours and then warmed to 72° C. for 2 hours. After drying, acrylic modified powders were obtained. The acrylic modified powders were adjusted with an aqueous NaOH solution, yielding an acrylic modified glass fiber paste (AMGP) having a solid content of 70% which was stored for use.

TABLE 2

| Raw materials | Description | Weight (g) |
|---|---|---|
| Methacryloxypropyl modified glass fiber | surface-modified glass fiber | 150 |
| Cyclohexane | Solvent | 300 |
| Acrylic acid | Hydrophilic monomer | 10 |
| Lauryl methacrylate | Hydrophobic monomer | 0.1 |
| AIBN | Initiator | 0.15 |
| Total | | 460.25 |

Example 2

Waterborne Coating Composition

A clear aqueous coating composition sample was prepared using the ingredients as shown in Table 3 below. Dow 3311 (acrylic copolymer resin) was used as a film-forming resin. Based on the weight of Dow 3311, 5 parts by weight and 10 parts by weight of AMGP were added to Sample 1 and Sample 2, respectively. For comparison purposes, Comparative Sample A consisted of all-acrylic aqueous latex without adding any glass fibers; and Comparative Sample B contained 5 parts by weight of untreated glass fibers as inorganic particles. When applied, each coating composition were used in combination with a hardener such as isocyanate HDI or TDI, wherein the ratio of hydroxyl groups to isocyanate was 1:1.1. The properties of the various coating compositions and the coatings formed therefrom were summarized in Table 3 below.

TABLE 3

| | Comparative Sample A | Comparative Sample B | Sample 1 | Sample 2 |
|---|---|---|---|---|
| *Ingredients* | | | | |
| Film-forming resin | Dow 3311 | Dow 3311 | Dow 3311 | Dow 3311 |
| Glass fiber | None | 5 wt %, untreated | 5 wt % AMGP | 10 wt % AMGP |
| *Properties* | | | | |
| Pencil hardness | HB | H | H | 2H |
| Adhesion | 5B | 5B | 5B | 5B |
| Gloss | 87.1 | 73 | 48.5 | 23.5 |
| Dry film transparency | 94.7 | 92.2 | 93.5 | 91.1 |
| Abrasion resistance, % | 70.1 | 77.8 | 84.6 | 86.7 |
| Anti-scratch (g, pass) | 100 | 300 | 500 | 400 |
| Settling (after storage at 50° C. for two weeks) | | Hard precipitate | Soft precipitate | Soft precipitate |

As can be seen from the above results, when the aqueous dispersion containing the polymer-inorganic particle composite of the present invention was used, the sedimentation problem was remarkably reduced, the storage stability was remarkably improved, and hardness, scratch resistance, and abrasion resistance of the film are significantly improved.

While the invention has been described with respect to a number of embodiments and examples, those skilled in the art, having benefit of this disclosure, will appreciate that other embodiments can be devised which do not depart from the scope and spirit of the invention as disclosed herein.

What is claimed is:

1. An aqueous dispersion comprising a polymer-inorganic particles composite, wherein the polymer has ionic hydrophilic groups and hydrophobic long chain hydrocarbyl groups, and the polymer is covalently linked to said inorganic particles, and the molar ratio of the ionic hydrophilic group to the hydrophobic long chain hydrocarbyl group is from 1000:1 to 100:1.

2. The aqueous dispersion according to claim 1, wherein the ionic hydrophilic group comprises a potential anionic hydrophilic group, an anionic hydrophilic group, a potential cationic hydrophilic group, a cationic hydrophilic group or any combination thereof.

3. The aqueous dispersion according to claim 2, wherein the ionic hydrophilic group comprises a carboxylic acid group or a salt thereof, a sulfuric acid group or a salt thereof, a phosphoric acid group or a salt thereof, a sulfonic acid group or a salt thereof, a phosphite group or a salt thereof, a phosphonic acid group or a salt thereof, an amine group or a quaternary ammonium salt thereof, or any combination thereof.

4. The aqueous dispersion according to claim 3, wherein the ionic hydrophilic group is derived from the group consisting of (meth)acrylic acid and a salt thereof, itaconic acid and a salt thereof, maleic acid and a salt thereof, fumaric acid and a salt thereof, crotonic acid and a salt thereof, (meth)acrylamide and a quaternary ammonium salt thereof, and any combination thereof.

5. The aqueous dispersion according to claim 1, wherein the hydrophobic long chain hydrocarbyl group is derived from a C8-C30 alkyl (meth)acrylate.

6. The aqueous dispersion according to claim 1, wherein the polymer is covalently bonded to the inorganic particle by a moiety containing —Si—O—linkage.

7. The aqueous dispersion according to claim 1, wherein the inorganic particles comprise inorganic fibers.

8. The aqueous dispersion according to claim 1, wherein the inorganic particles have an equivalent diameter of from 1 to 100 microns.

9. The aqueous dispersion according to claim 1, wherein the amount of the inorganic particle is from 40 to 99.5 wt %, relative to the total weight of the inorganic particles and the polymer-forming monomer components.

10. The aqueous dispersion according to claim 1, wherein the aqueous dispersion has a solid content by weight of from 50 to 90%.

11. The aqueous dispersion according to claim 1, wherein the aqueous dispersion has a pH value of from 6 to 9.

12. A process for the preparation of an aqueous dispersion, comprising the steps of:
   a) providing inorganic particles bearing one or more groups reactive with a monomer component;
   b) reacting a polymer-forming monomer component with the inorganic particles bearing one or more groups reactive with a monomer component, to obtain a polymer-inorganic particles composite, wherein the polymer has ionic hydrophilic groups and hydrophobic long chain hydrocarbyl groups, and the molar ratio of the ionic hydrophilic group to the hydrophobic long chain hydrocarbyl group is from 1000:1 to 100:1, and the polymer is covalently linked to said inorganic particles;
   c) adjusting the composite with a pH adjuster, to obtain the aqueous dispersion.

13. The process according to claim 12, wherein the step of providing inorganic particles bearing one or more groups reactive with a monomer component comprises surface modifying the inorganic particles with a coupling agent bearing one or more groups reactive with a monomer component.

14. The process according to claim 12, wherein the coupling agent comprises a silane coupling agent.

15. The process according to claim 12, wherein the coupling agent comprises a silane compound having the formula:

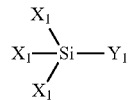

in which
each $X_1$ is independently —Cl, —OCH$_3$, —OCH$_2$CH$_3$, —OC$_2$H$_4$OCH$_3$, —OSi(CH$_3$)$_3$, or —OCOCH$_3$; and
$Y_1$ is an alkyl group substituted with an ethylenically unsaturated functional group.

16. The process according to claim 12, wherein the coupling agent comprises a silane compound comprising γ-methacryloxypropyl trimethoxy silane.

17. The process according to claim 12, wherein the coupling agent comprises an oligomeric silane having the formula:

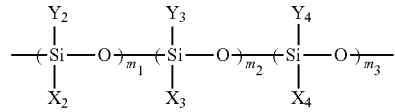

wherein each of $X_2$, $X_3$ and $X_4$ is independently —Cl, —OCH$_3$, —OCH$_2$CH$_3$, —OC$_2$H$_4$OCH$_3$, —OSi(CH$_3$)$_3$, —OCOCH$_3$, —H, —CH$_3$, —C$_2$H$_5$, and —OH with the proviso that at least one of $X_2$, $X_3$ and $X_4$ is not —H, —CH$_3$, —C$_2$H$_5$, or —OH;

each of $Y_2$, $Y_3$ and $Y_4$ is independently an alkyl group substituted with an ethylenically unsaturated functional group; and each of $m_1$, $m_2$ and $m_3$ independently is from 0 to 200, with the proviso that at least one of $m_1$, $m_2$ and $m_3$ is not 0.

18. The process according to claim 12, wherein the coupling agent is used in an amount of from 0.2 to 10 wt %, relative to the total weight of the inorganic particles.

19. The process according to claim 12, wherein the polymer-forming monomer component having an ionic hydrophilic group comprises the monomers selected from the group consisting of: (meth)acrylic acid, itaconic acid, maleic acid, fumaric acid, crotonic acid, (meth)acrylamide, and any combination thereof.

20. The process according to claim 12, wherein the polymer-forming monomer component having a hydrophobic long chain hydrocarbyl group comprises C8-C30 alkyl (meth)acrylate monomer.

21. The process according to claim 12, wherein the amount of the inorganic particles is from 40 to 99.5 wt %, relative to the total weight of the inorganic particles and the polymer-forming monomer components.

22. The process according to claim 12, wherein the pH adjuster comprises inorganic acids, organic acids, alkaline (earth) metal oxides, alkaline (earth) hydroxides, alkaline (earth) salts, ammonia, or any combination thereof.

23. The process according to claim 22, the pH adjuster comprises HCl, H$_2$SO$_4$, H$_3$PO$_4$, HNO$_3$, citric acid, succinic acid, malic acid, lactic acid, ammonia, NaOH, KOH, calcium carbonate, sodium carbonate, or any combination thereof.

24. Powdered fillers obtained by drying the aqueous dispersion according to claim 1.

25. A waterborne coating composition, comprising the aqueous dispersion according to claim 1.

26. The waterborne coating composition according to claim 25, wherein the aqueous dispersion is present in an amount of from 1 to 30 wt %, relative to the total weight of the waterborne coating composition.

27. A coated article, comprising a substrate on which the aqueous dispersion according to claim 1.

28. The coated article according to claim 27, wherein the substrate comprises wood, wall, or metal.

\* \* \* \* \*